(12) United States Patent
Langenberg et al.

(10) Patent No.: US 11,171,503 B2
(45) Date of Patent: Nov. 9, 2021

(54) WIRELESS POWER STATUS THROUGH BOOSTED OUTPUT VOLTAGE

(71) Applicant: Schlage Lock Company LLC, Carmel, IN (US)

(72) Inventors: Daniel Langenberg, Zionsville, IN (US); Justin D. Seacat, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 180 days.

(21) Appl. No.: 16/678,065

(22) Filed: Nov. 8, 2019

(65) Prior Publication Data

US 2020/0153267 A1 May 14, 2020

Related U.S. Application Data

(60) Provisional application No. 62/757,733, filed on Nov. 8, 2018.

(51) Int. Cl.
| | |
|---|---|
| *H01M 10/44* | (2006.01) |
| *H01M 10/46* | (2006.01) |
| *H02J 7/02* | (2016.01) |
| *E05B 47/00* | (2006.01) |
| *H02J 50/30* | (2016.01) |

(52) U.S. Cl.
CPC .............. *H02J 7/027* (2013.01); *E05B 47/00* (2013.01); *H02J 7/025* (2013.01); *H02J 50/30* (2016.02); *E05B 2047/0091* (2013.01)

(58) Field of Classification Search
CPC ...... H02J 7/0047; H02J 7/0048; H02J 7/0021; H02J 7/0029; H02J 50/005; H02J 50/10; E05B 2047/0091; E05B 2047/0058; E05B 2047/0007; E05B 47/00; E05B 47/0002
USPC ..... 320/107, 108, 114, 115; 307/104; 70/57, 70/271, 275, 276, 277, DIG. 3
See application file for complete search history.

(56) References Cited

U.S. PATENT DOCUMENTS

| | | | | |
|---|---|---|---|---|
| 8,354,914 | B2* | 1/2013 | Buckingham | E05B 47/00 340/5.6 |
| 10,049,517 | B2* | 8/2018 | Geiszler | G07C 9/00309 |
| 2014/0340032 | A1* | 11/2014 | Curtis | H02J 5/005 320/108 |
| 2017/0018956 | A1* | 1/2017 | Geiszler | H02J 7/00034 |
| 2017/0237296 | A1* | 8/2017 | Keith | H02J 50/80 307/104 |

(Continued)

*Primary Examiner* — Edward Tso
(74) *Attorney, Agent, or Firm* — Taft Stettinius & Hollister LLP (57) ABSTRACT

A method according to one embodiment includes removing a battery cover from an outer assembly of a lock device, removing a battery pack from the lock device in response to removing the battery cover, wherein removing the battery pack comprises disconnecting two electrical contacts of the battery pack from two corresponding electrical contacts of the lock device, and electrically coupling two electrical contacts of a retrofit assembly to the two corresponding electrical contacts of the lock device, wherein the retrofit assembly includes an energy storage device, a wireless power receiver configured to store generated power in the energy storage device, a boost regulator, and a microcontroller configured to adjust an output voltage of the boost regulator to indicate a power level of the energy storage device and a charging status of the energy storage device.

20 Claims, 7 Drawing Sheets

(56) References Cited

U.S. PATENT DOCUMENTS

2019/0148968 A1* 5/2019 Kim .................. H02J 50/80
  320/108
2019/0273443 A1* 9/2019 Tian ................ H02M 3/33523

* cited by examiner

WIRELESS POWER STATUS THROUGH BOOSTED OUTPUT VOLTAGE

CROSS-REFERENCE TO RELATED APPLICATIONS

The present application claims the benefit of U.S. Provisional Patent Application No. 62/757,733 filed Nov. 8, 2018, the contents of which are incorporated by reference in their entirety.

BACKGROUND

Electronic locks and other edge devices are prevalent in today's access control systems. Users need to know how much battery life is left in their product to ensure that they have enough power to perform desired actions. Oftentimes, the electronic locks and other edge devices are powered by a battery pack that is wired to a controller with two wires for the monitoring of the power consumed to determine the remaining battery life. For example, the remaining battery life may be estimated through an analog voltage reading of the battery pack and/or through coulomb counting. Typically, such systems require a third wire if the system is to communicate status information regarding the connectivity of the battery pack to an external power source (e.g., for charging).

SUMMARY

According to an embodiment, a method may include removing a battery cover from an outer assembly of a lock device, removing a battery pack from the lock device in response to removing the battery cover, wherein removing the battery pack comprises disconnecting two electrical contacts of the battery pack from two corresponding electrical contacts of the lock device, electrically coupling two electrical contacts of a retrofit assembly to the two corresponding electrical contacts of the lock device, wherein the retrofit assembly includes an energy storage device, a wireless power receiver configured to store generated power in the energy storage device, a boost regulator, and a microcontroller configured to adjust an output voltage of the boost regulator to indicate a power level of the energy storage device and a charging status of the energy storage device.

In some embodiments, adjusting the output voltage to indicate the power level of the energy storage device and the charging status of the energy storage device may include adjusting the output voltage to within a first voltage range if the charging status indicates that the energy storage device is charging and adjusting the output voltage to within a second voltage range if the charging status indicates that the energy storage device is not charging, wherein the second voltage range is non-overlapping with the first voltage range.

In some embodiments, adjusting the voltage output to indicative the power level of the energy storage device and the charging status of the energy storage device may include adjusting the output voltage to a voltage value within the first voltage range that is proportionate within the first voltage range to a percentage of power remaining in the energy storage device if the charging status indicates that the energy storage device is charging and adjusting the output voltage to a voltage value within the second voltage range that is proportionate within the second voltage range to a percentage of power remaining in the energy storage device if the charging status indicates that the energy storage device is not charging.

In some embodiments, the first voltage range may be from 5.5V to 7V and the second voltage range is from 4V to 5.5V.

In some embodiments, the method may further include receiving, by a microcontroller of the lock device, the output voltage sensed at the two corresponding electrical contacts and analyzing, by the microcontroller of the lock device, the output voltage to determine the power level of the energy storage device and the charging status of the energy storage device.

In some embodiments, the energy storage device, the wireless power receiver, the boost regulator, and the microcontroller may form a portion of a modular component.

In some embodiments, the energy storage device may include a rechargeable lithium battery.

In some embodiments, the retrofit assembly may be electrically coupled to the lock device via only the two corresponding electrical contacts of the lock device.

In some embodiments, the boost regulator may include a boost converter and a feedback network.

In some embodiments, the feedback network may include a digital potentiometer.

In some embodiments, the method may further include generating power with the wireless power receiver based on electromagnetic radiation absorbed by the wireless power receiver.

In some embodiments, the electromagnetic radiation may further include directed infrared light.

According to another embodiment, a retrofit assembly may include two electrical contacts, an energy storage device, a wireless power receiver configured to convert electromagnetic radiation into electrical power stored in the energy storage device, a boost regulator configured to vary feedback resistance based on one or more input signals to adjust an output voltage across the two electrical contacts, and a microcontroller configured to transmit the one or more input signals to the boost regulator to adjust the output voltage based on a power level of the energy storage device and a charging status of the energy storage device.

In some embodiments, to adjust the output voltage to indicate the power level of the energy storage device and the charging status of the energy storage device may include to adjust the output voltage to within a first voltage range if the charging status indicates that the energy storage device is charging, and to adjust the output voltage to within a second voltage range if the charging status indicates that the energy storage device is not charging, wherein the second voltage range is non-overlapping with the first voltage range.

In some embodiments, to adjust the voltage output to indicative the power level of the energy storage device and the charging status of the energy storage device may include to adjust the output voltage to a voltage value within the first voltage range that is proportionate within the first voltage range to a percentage of power remaining in the energy storage device if the charging status indicates that the energy storage device is charging and to adjust the output voltage to a voltage value within the second voltage range that is proportionate within the second voltage range to a percentage of power remaining in the energy storage device if the charging status indicates that the energy storage device is not charging.

In some embodiments, the energy storage device, the wireless power receiver, the boost regulator, and the microcontroller may form a portion of a modular component, and in other embodiments the energy storage device may include a rechargeable lithium battery.

In some embodiments, the retrofit assembly may be electrically coupled to a lock device via only the two electrical contacts.

In some embodiments, the boost regulator may include a boost converter and a feedback network.

In some embodiments, the feedback network may include a digital potentiometer.

Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Figure 1:
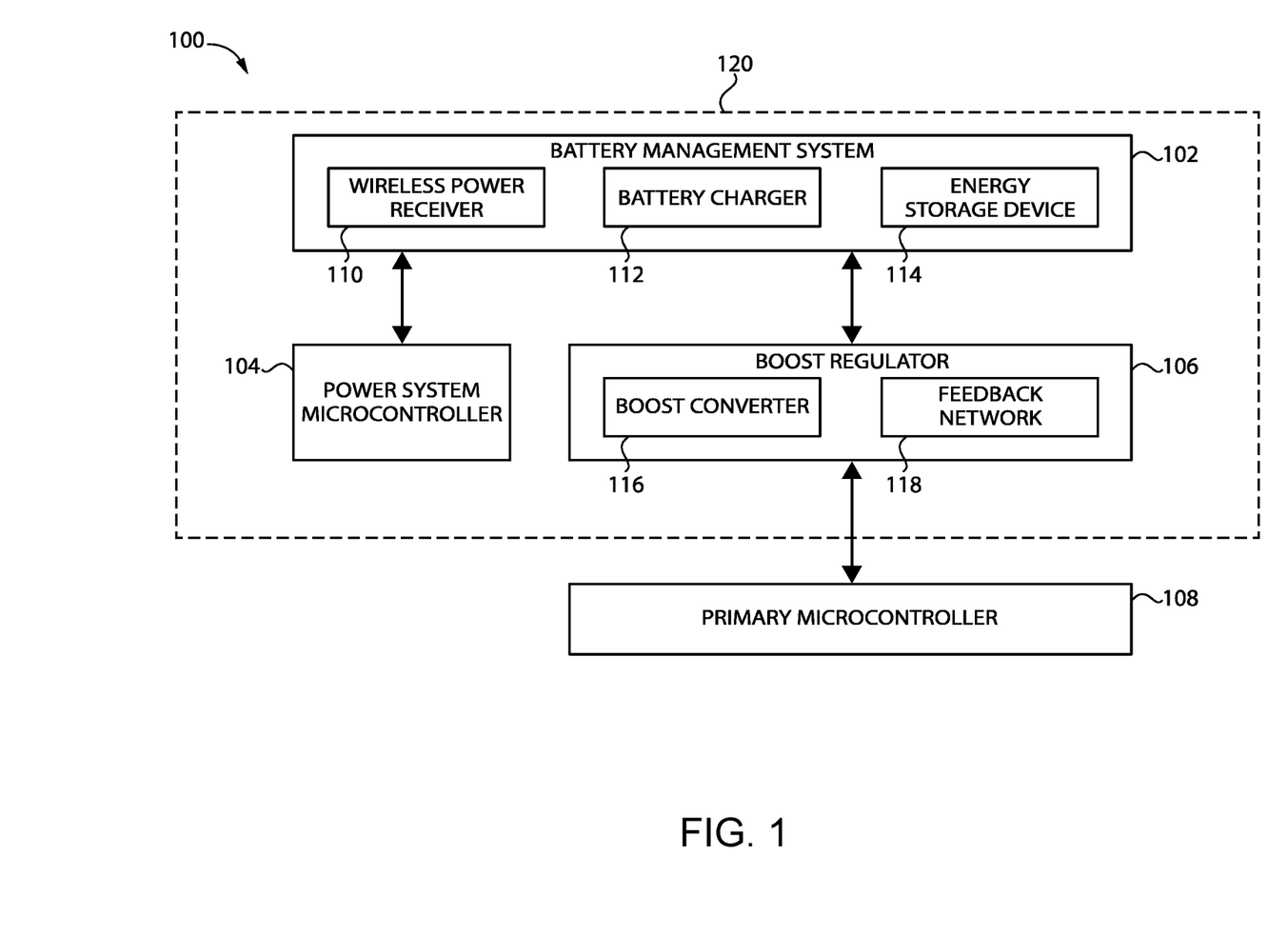
FIG. 1 is a simplified block diagram of at least one embodiment of a system.

Referring now to FIG. 1, in the illustrative embodiment, a system 100 for monitoring voltages and charging modes of an energy storage device includes a battery management system 102, a power system microcontroller 104, a boost regulator 106, and a primary microcontroller 108. Further, as shown in FIG. 1, the illustrative battery management system 102 includes a wireless power receiver 110, a battery charger 112, and an energy storage device 114, and the illustrative boost regulator 106 includes a boost converter 116 and a feedback network 118.

In some embodiments, the battery management system 102, the power system microcontroller 104, and the boost regulator 106 may form a portion of a modular retrofit assembly 120 as described below. As indicated above, many electronic locks and other edges devices are powered by a battery back that is wired and/or otherwise electrically coupled to a primary controller 108 of the lock device or other edge device with two wires for the monitoring of the power consumed to determine the remaining battery life, and a third wire or electrical coupling is used to communicate status information regarding the connectivity of the battery pack to an external power source (e.g., charging status). As such, the systems and techniques described herein allow the system 100 or, more specifically, the retrofit assembly 120 to be installed while using only the two wires or electrical contacts already present for determining the remaining battery life. However, unlike other two-wired systems, the system 100 is also able to determine the connectivity status of the battery without the use of additional wires. In other words, the system 100 provides a two-wired, or two-contact, system that allows for remote user feedback on the power of the system indicating the battery level and whether the battery is currently being charged.

The wireless power receiver 110 is configured to wirelessly receive power from a remote wireless power transmitter. For example, in the illustrative embodiment, a wireless power transmitter (e.g., an infrared laser) is configured to convert power into electromagnetic (EM) radiation, such as infrared light, and direct that EM radiation to the wireless power receiver 110, for example, as a directed energy beam. While infrared light has been provided as one example of such EM radiation, it should be appreciated that other frequencies of EM radiation may be utilized in other embodiments. The wireless power receiver 110 absorbs the EM radiation directed toward it and is configured to convert the EM radiation into electrical power usable by the system 100. It should be appreciated that, in some embodiments, the wireless power receiver 110 may include one or more photovoltaic cells/arrays (see, for example, the photovoltaic cells depicted in the wireless power receiver 110 of FIG. 6). In other embodiments, it should be appreciated that the wireless power receiver 110 may be configured to otherwise wirelessly receive and/or generate power. For example, in some embodiments, the wireless power receiver 110 may be configured to leverage long range wireless energy harvesting techniques (i.e., RF harvesting) to wirelessly receive/generate power from a nearby wireless power transmitter (e.g., operating at 915 MHz or 2.4 GHz).

The battery charger 112 is configured to receive the power generated by the wireless power receiver 110 and store the generated power and/or a portion thereof to the energy storage device 114 and/or direct the generated power or a portion thereof to the boost regulator 106 and/or the power system microcontroller 104. In the illustrative embodiment, the energy storage device 114 is embodied as one or more rechargeable batteries (e.g., rechargeable lithium batteries). However, it should be appreciated that the energy storage device 114 may be embodied as one or more capacitor banks, supercapacitors, and/or other rechargeable energy storage devices suitable for performing the functions described herein in other embodiments.

It should be appreciated that, in some embodiments, the battery management system 102 or one or more of the components thereof may filter and/or otherwise modify the various power signals that are received by, transmitted from, and/or passed through the battery management system 102. For example, in some embodiments, the wireless power receiver 110 may be configured to generate 5V power for storage and/or use by the system 100, whereas the battery management system 102 may output a 3.7V battery management input signal to the boost regulator 106 for further signal processing (e.g., voltage boosting).

In the illustrative embodiment, the battery management system 102 supplies a battery management input signal (e.g., at 3.7V) to the boost regulator 106 or, more specifically, the boost converter 116, and supplies a battery status signal to the power system microcontroller 104. The battery management system 102 or, more specifically, the battery charger 112 may include various pins and/or be capable of providing various data to the power system microcontroller 104 to inform the power system microcontroller 104 of the power status of the energy storage device 114 and its charge status. Based on the battery power and charging characteristics received from the battery management system 102, the power system microcontroller 104 is able to transmit one or more signals to the boost regulator 106 in order to vary the output voltage to the primary microcontroller 108. In some embodiments, a battery management chip provides status outputs, such as "charging" and "power good," which may be routed to one or more MOSFETs that switch in different feedback resistor values for the boost converter 116.

In the illustrative embodiment, the boost converter 116 receives the battery management input signal (e.g., at 3.7V) and boosts the signal to a usable voltage. For example, in some embodiments, the boost converter 116 boosts the input signal such that it is between 4V and 7V. Further, the feedback network 118 of the boost regulator 106 varies its resistance based on control signals received from the power system microcontroller 104 (e.g., via an I²C interface), which allows the feedback voltage to be varied and ultimately allows for the variance in the output voltage supplied to the primary microcontroller 108. It should be appreciated that each of the boost converter 116 and the feedback network 118 may be embodied as any suitable component(s) and/or circuitry suitable for performing the functions described herein. For example, in some embodiments, the feedback network 118 is embodied as a digital potentiometer. However, in other embodiments, the feedback network 118 may be embodied as an R2R resistor ladder varying the feedback resistance, one or more operational amplifier(s) operating as a feedback loop, and/or another suitable feedback network 118. In other embodiments, the power system microcontroller 104 may be omitted; instead, for example, the system 100 may utilize the battery charger 112 native output into an analog feedback system, providing feedback loop scaling based on "charge status" and "power good" outputs.

In the illustrative embodiment, the voltage range is further "broken" into two major non-overlapping voltage regions, which are indicative of the wireless charging status. For example, without loss of generality, the voltage range of 4-5.5V may represent that the wireless charging by the wireless power receiver 110 is not present, and the voltage range of 5.5-7V may represent that the wireless charging by the wireless power receiver 110 is present. Further, within each region, the output voltage can be "broken" into a ratio of the battery power. For example, if the energy storage device 114 is charged to 90% power, a voltage may be output that represents 90% of the total region. In other words, the battery charge of the energy storage device 114 may be represented by an output voltage of (Region_Ceiling−Region_Floor)*Battery %+Region_Floor based on the particular region associated with the wireless charging status of the wireless power receiver 110 (e.g., the 4-5.5V region or the 5.5-7V region). For example, an output voltage of 4V would indicate that the wireless charging is not present and the energy storage device 114 is depleted, whereas an output voltage of 5.5V would indicate that the wireless charging is not present but the energy storage device 114 is fully charged. Further, an output voltage of 6.25V would indicate that the wireless charging is present and the power level of the energy storage device 114 is at 50%. Similarly, an output voltage of 4.75V would indicate that wireless charging is not present and the power level of the energy storage device 114 is at 50%. In the illustrative embodiment, it should be appreciated that the power ratio is represented linearly within each voltage range; however, it should be appreciated that the power ratio may be otherwise represented in other embodiments. Further, in other embodiments, the voltage regions may be represented by different non-overlapping voltage regions.

It should be appreciated that techniques described herein allow for the system 100 to indicate both the remaining battery life (e.g., power level) of the energy storage device 114 and also the charge status (i.e., whether the energy storage device 114 is charging via the wireless power receiver 110) using a single output voltage value. As described herein, in some embodiments, the power system microcontroller 104 provides one or more signals to the boost regulator 106, which varies the feedback resistance in order to result in an output voltage to the primary microcontroller 108 that represents the battery life and charging status as described herein. Further, the microcontroller 108 is configured to read the output voltage value (e.g., via the two wires/contacts described above) and determine those characteristics of the battery based on the corresponding algorithm.

Additionally, it should be appreciated that the system 100 may form a portion of a lock device, reader device, exit device, auto-operator device, edge device, or other computing device or system, which may include features similar to the features described below in reference to the computing device 200 of FIG. 2. For example, in some embodiments, the primary microcontroller 108 of the system 100 may be embodied as or include the processing device 202 and/or memory 206 of FIG. 2. It should be further appreciated that in embodiments in which the system 100 forms a portion of a lock device, for example, the lock device may include a lock mechanism configured to control access to an access point and/or other components typical of a lock device. For example, the lock device may include a lock mechanism having a deadbolt, latch bolt, lever, and/or other mechanism adapted to move between a locked and unlocked state.

Figure 2:
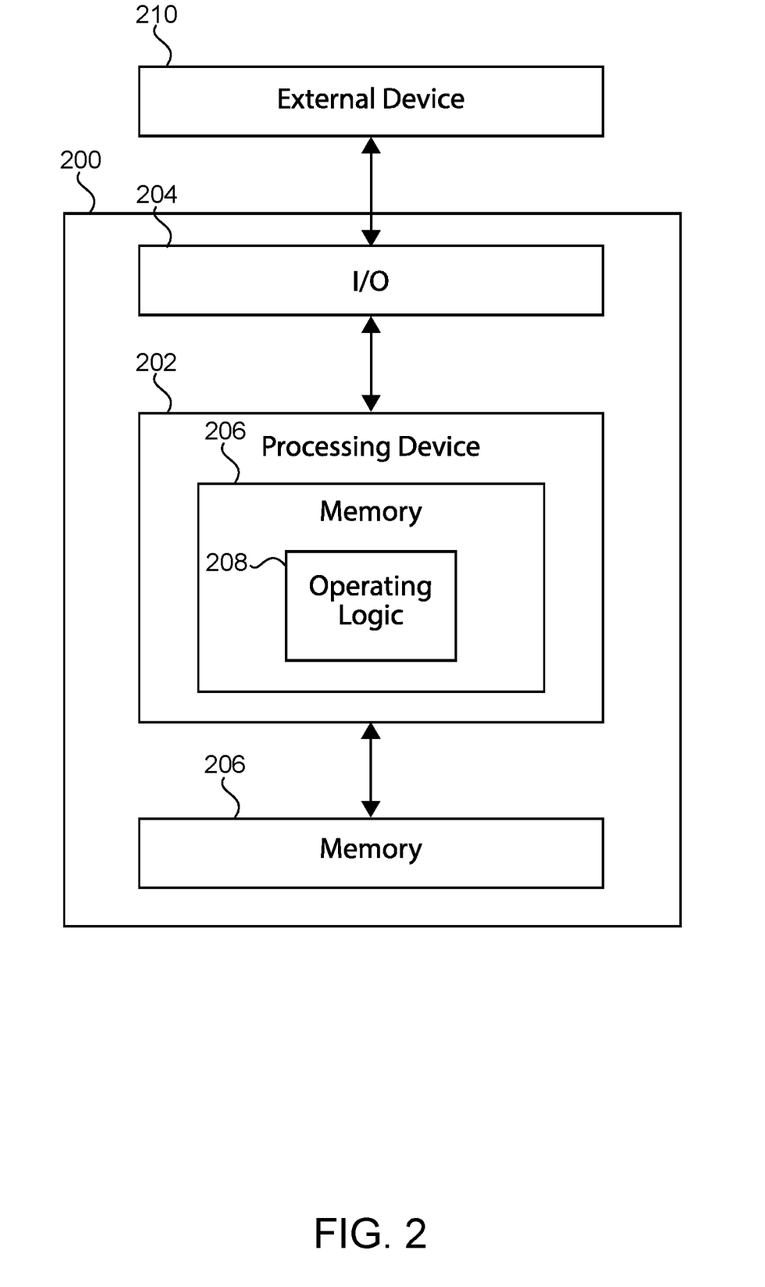
FIG. 2 is a simplified block diagram of at least one embodiment of a computing system.

Referring now to FIG. 2, a simplified block diagram of at least one embodiment of a computing device 200 is shown. Depending on the particular embodiment, the computing device 200 may be embodied as a lock device, reader device, exit device, auto-operator device, edge device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth (including Bluetooth Low Energy (BLE), Wi-Fi (e.g., infrastructure of ad hoc mode), Wi-Fi Direct, WiMAX, Zigbee, Z-wave, Near Field Communication (NFC), IEEE 802.15, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as a host system, access control panel, mobile device, gateway device, and/or other device in an access control system. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems (e.g., real-time operating systems (RTOS)), applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208.

As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a microcontroller or system-on-a-chip (SoC) and be incorporated on a single integrated circuit chip. Further, depending on the particular embodiment, the components of the computing device 200 may be closely positioned to one another or distributed throughout the computing device 200 (i.e., separated from one another) depending on the particular embodiment of the computing device 200.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
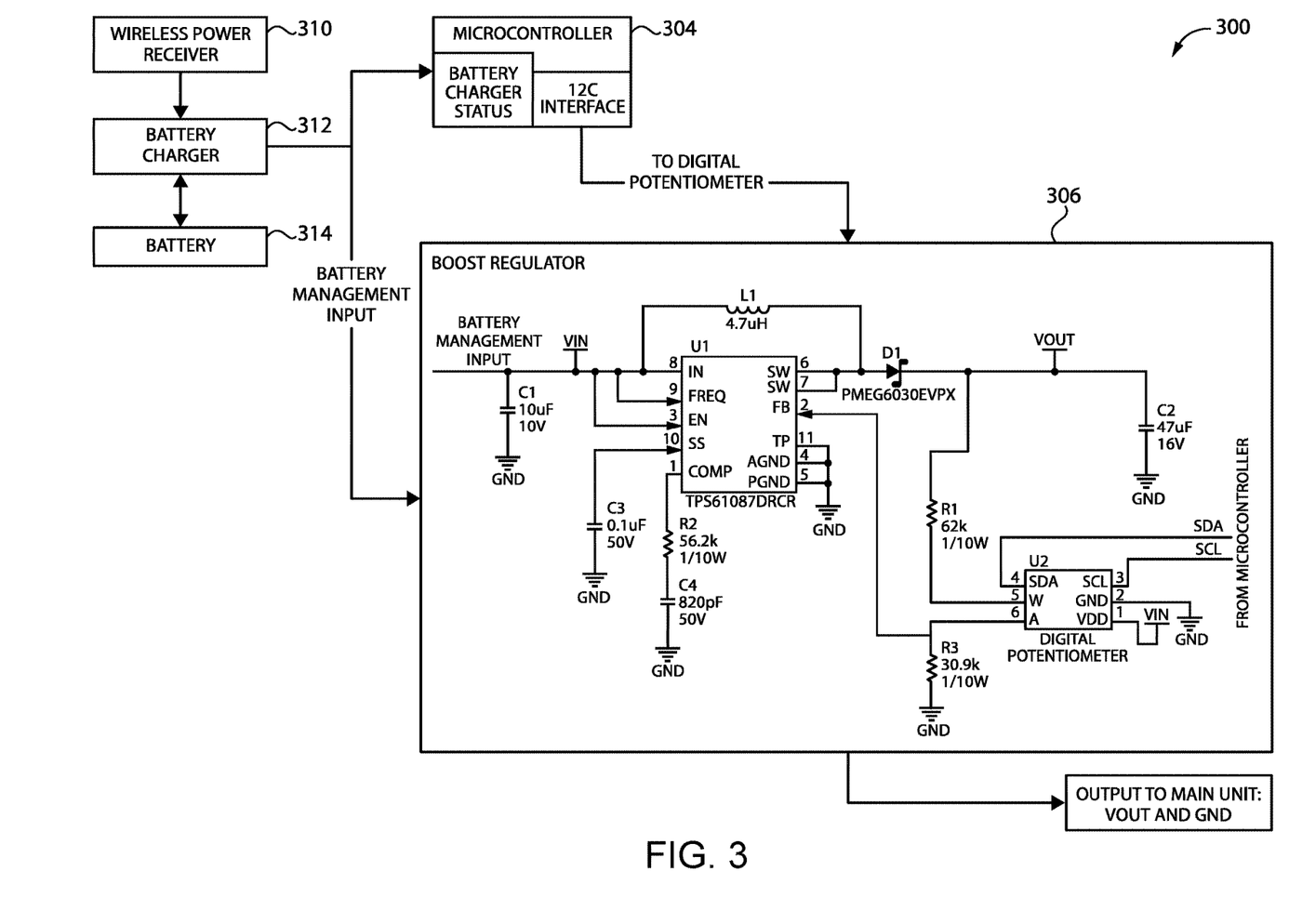
FIG. 3 is a simplified diagram and electrical schematic of at least one embodiment of the system of FIG. 1.
Figure 4:
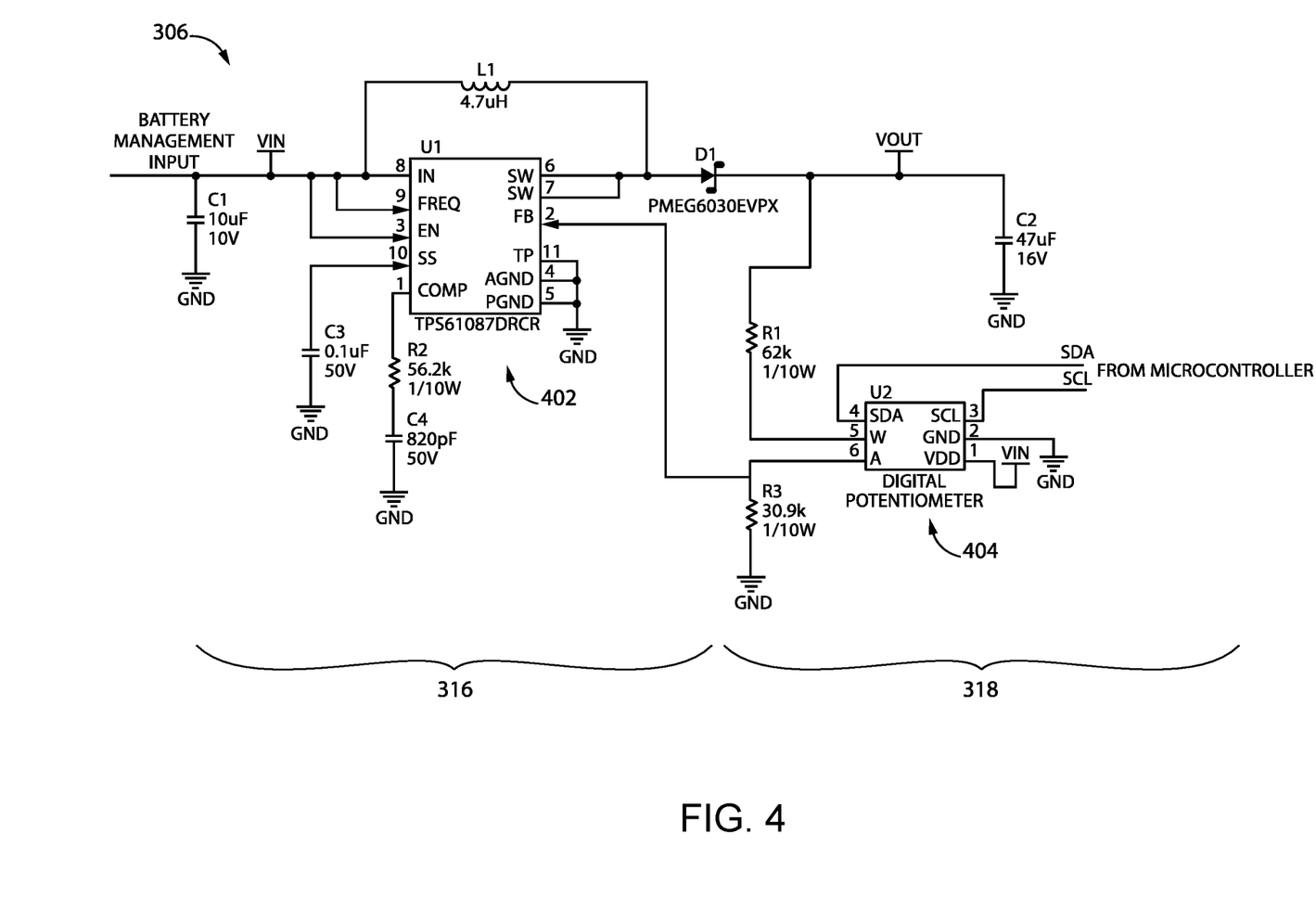
FIG. 4 is a simplified electrical schematic of at least one embodiment of a boost regulator of FIG. 3.

Referring now to FIGS. 3-4, at least one illustrative embodiment of the system 100 is depicted as a system 300. The system 300 includes a microcontroller 304, a boost regulator 306, a wireless power receiver 310, a battery charger 312, and a battery 314. Further, as depicted in FIG. 4, the boost regulator 306 includes a boost converter 316 and a feedback network 318. It should be appreciated that the microcontroller 304, the wireless power receiver 310, the battery charger 312, and the battery 314 of the system 300 may be similar to the power system microcontroller 104, the wireless power receiver 110, the battery charger 112, and the energy storage device 114 of the system 100, respectively, and therefore the description of those components and the functionality thereof is equally applicable and is not duplicated herein for brevity of the description. Further, it should be appreciated that the boost regulator 306, the boost converter 316, and the feedback network 318 are particular embodiments of and therefore include similar functionality to the boost regulator 106, the boost converter 116, and the feedback network 118, respectively, of the system 100.

As shown in FIGS. 3-4, power enters the boost regulator 306 from an output on the battery charger 312 (e.g., at 3.7V), which is depicted as a "BATTERY MANAGER INPUT." The boost converter 316 includes a boost converter inductor (L1), a DC-DC converter 402, and a boost converter diode (D1). As described above, the boost converter 316 "boosts" the input voltage (e.g., the "BATTERY MANAGER INPUT" voltage input) into a usable voltage. The illustrative feedback network 318 of FIGS. 3-4 includes resistors (R1 and R3) and a digital potentiometer 404. For example, in some embodiments, the digital potentiometer 404 may be embodied as a 100 kΩ digital potentiometer. In some embodiments, approximately 62 kΩ resistance may be associated with the lowest voltage in the range described above and therefore, with a 100 kΩ, approximately 162 kΩ resistance may be associated with the highest voltage in the range.

Figure 5:
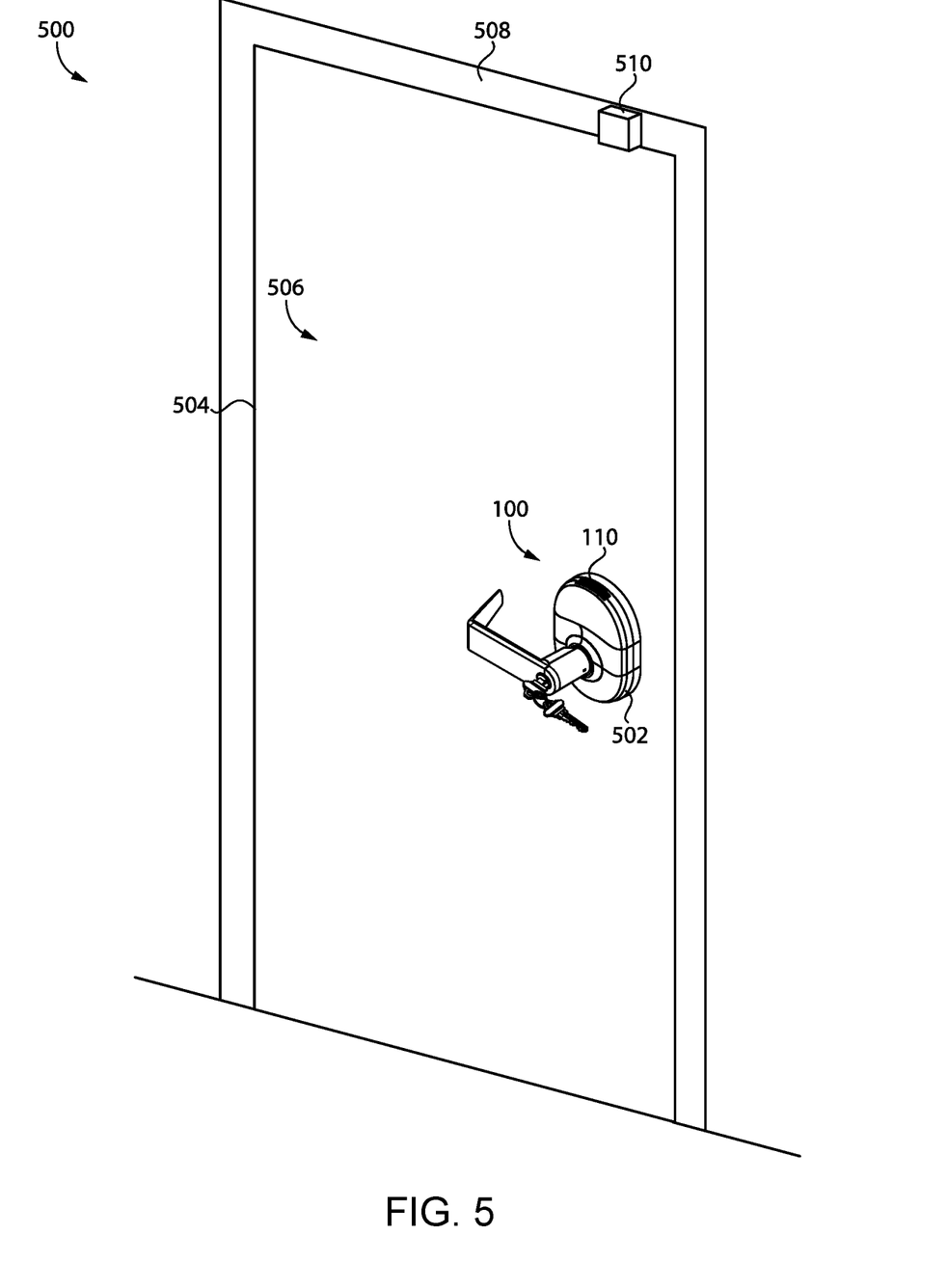
FIG. 5 is a perspective view of at least one embodiment of an access point including the system of FIG. 1.

Referring now to FIG. 5, in some embodiments, the system 100 may form a portion of a lock device 502 at an access point 500. It should be appreciated that the access point 500 may include a door 504 that secures a passageway 506 when closed (e.g., via a corresponding lock mechanism). In some embodiments, the door 504 may be mounted for movement relative to a door frame 508, (e.g., hinged/swinging movement, sliding movement, etc.). In the illustrative embodiment, a wireless power transmitter 510 is secured to the door frame 508, adjacent wall, ceiling, or elsewhere nearby the access point 500 and is configured to transmit power (e.g., via EM radiation) to the wireless power receiver 110 of the system 100 for generation of power as described above.

Figure 6:
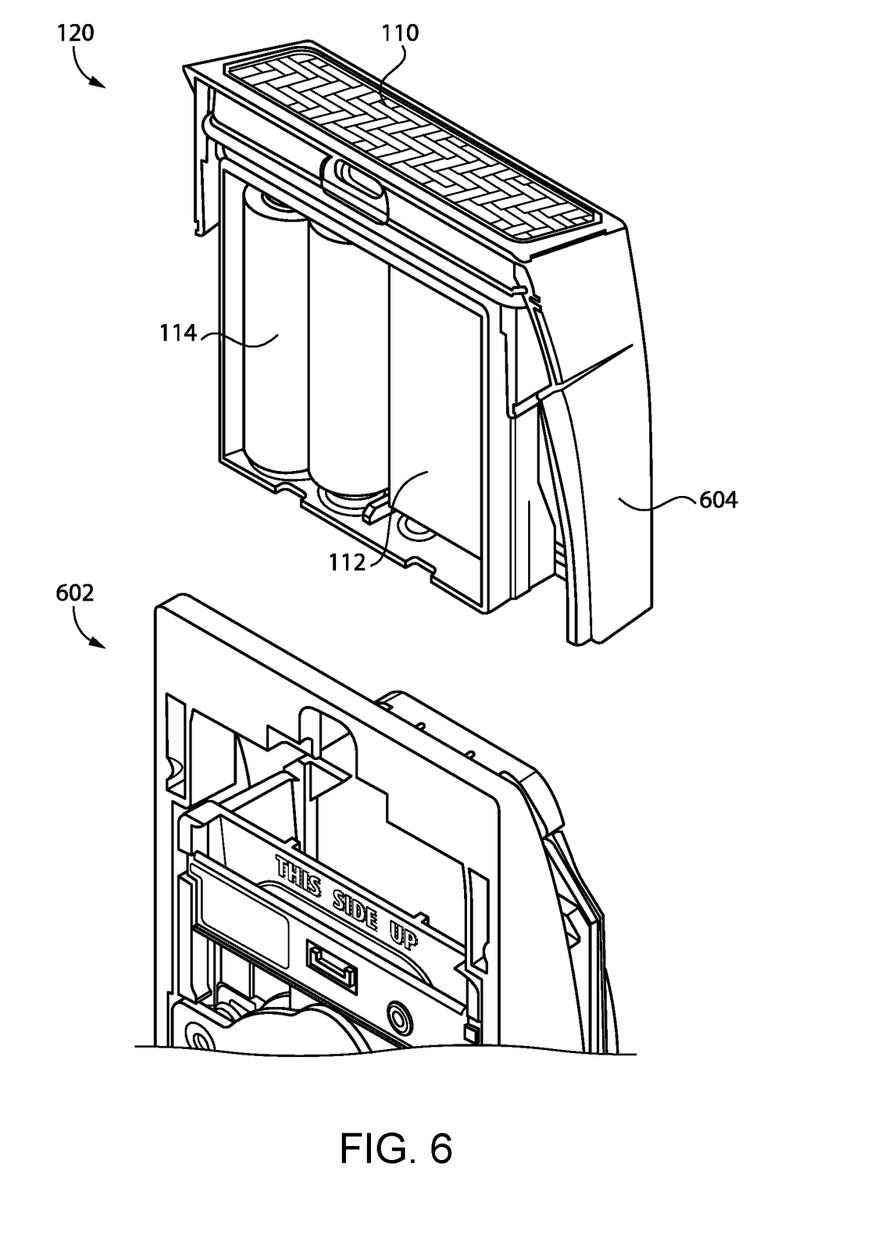
FIGS. 6-7 are perspective views of at least one embodiment of a retrofit assembly.
Figure 7:
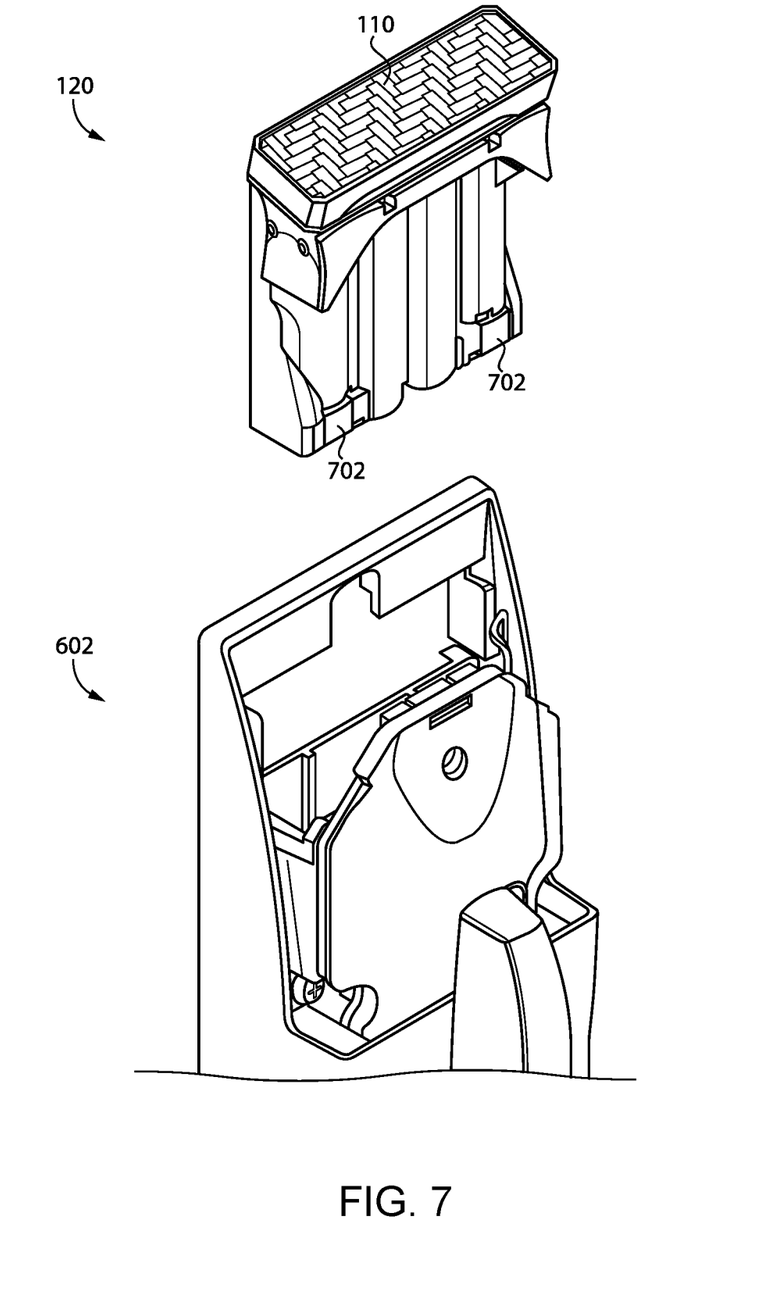

As described above, in some embodiments, the battery management system 102, the power system microcontroller 104, and the boost regulator 106 may form a portion of a modular retrofit assembly 120 for a lock device 602 and/or other device. At least one embodiment of such a retrofit assembly 120 is depicted in FIGS. 6-7. Although the techniques described herein apply equally well to retrofitting other devices with similar electrical contacts, the retrofitting is described herein with respect to the lock device 602 for simplicity of the description.

During installation of the retrofit assembly 120, the existing battery system is first removed. To do so, the battery cover is removed from an outer assembly of the lock device 602 to expose the battery pack, and the battery pack is removed from the lock device 602 (e.g., by disconnecting the battery pack from the two wires or electrical contacts described herein). It should be appreciated that, in the illustrative embodiment, the two electrical wires/contacts may be the positive/negative battery terminals and/or may traditionally be used by the primary microcontroller 108 simply to monitor battery life (e.g., of Alkaline batteries) and indicate to the user whether the batteries need to be replaced.

Once the existing battery system has been removed, the retrofit assembly 120 may be installed in the lock device 602. As depicted in FIGS. 6-7, the wireless power receiver 110, the battery charger 112, the energy storage device 114, and the new battery cover 604 are integrated as a single module of the illustrative retrofit assembly 120 such that all of those components can be installed into the lock device 602 simultaneously. However, in other embodiments, it should be appreciated that one or more of the components may be installed separately. In the illustrative embodiment, the retrofit assembly 120 "slides" into the lock device 602 and the two wires/contacts that were previously connected to the battery terminals of the old battery back are connected to the wires/contacts 702 of the retrofit assembly 120. Although the illustrative wireless power receiver 110 is depicted as photovoltaic cells, it should be appreciated that the wireless power receiver 110 may be otherwise embodied in other embodiments.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   removing a battery cover from an outer assembly of a lock device;
   removing a battery pack from the lock device in response to removing the battery cover, wherein removing the battery pack comprises disconnecting two electrical contacts of the battery pack from two corresponding electrical contacts of the lock device; and
   electrically coupling two electrical contacts of a retrofit assembly to the two corresponding electrical contacts of the lock device, wherein the retrofit assembly includes an energy storage device, a wireless power receiver configured to store generated power in the energy storage device, a boost regulator, and a microcontroller configured to adjust an output voltage of the boost regulator to indicate a power level of the energy storage device and a charging status of the energy storage device.

2. The method of claim 1, wherein adjusting the output voltage to indicate the power level of the energy storage device and the charging status of the energy storage device comprises:
   adjusting the output voltage to within a first voltage range if the charging status indicates that the energy storage device is charging; and
   adjusting the output voltage to within a second voltage range if the charging status indicates that the energy storage device is not charging, wherein the second voltage range is non-overlapping with the first voltage range.

3. The method of claim 2, wherein adjusting the voltage output to indicative the power level of the energy storage device and the charging status of the energy storage device comprises:
   adjusting the output voltage to a voltage value within the first voltage range that is proportionate within the first voltage range to a percentage of power remaining in the energy storage device if the charging status indicates that the energy storage device is charging; and
   adjusting the output voltage to a voltage value within the second voltage range that is proportionate within the second voltage range to a percentage of power remaining in the energy storage device if the charging status indicates that the energy storage device is not charging.

4. The method of claim 3, wherein the first voltage range is from 5.5V to 7V and the second voltage range is from 4V to 5.5V.

5. The method of claim 1, further comprising:
   receiving, by a microcontroller of the lock device, the output voltage sensed at the two corresponding electrical contacts; and
   analyzing, by the microcontroller of the lock device, the output voltage to determine the power level of the energy storage device and the charging status of the energy storage device.

6. The method of claim 1, wherein the energy storage device, the wireless power receiver, the boost regulator, and the microcontroller form a portion of a modular component.

7. The method of claim 1, wherein the energy storage device comprises a rechargeable lithium battery.

8. The method of claim 1, wherein the retrofit assembly is electrically coupled to the lock device via only the two corresponding electrical contacts of the lock device.

9. The method of claim 1, wherein the boost regulator comprises a boost converter and a feedback network.

10. The method of claim 9, wherein the feedback network comprises a digital potentiometer.

11. The method of claim 1, further comprising generating power with the wireless power receiver based on electromagnetic radiation absorbed by the wireless power receiver.

12. The method of claim 11, wherein the electromagnetic radiation comprises directed infrared light.

13. A retrofit assembly, comprising:
   two electrical contacts;
   an energy storage device;
   a wireless power receiver configured to convert electromagnetic radiation into electrical power stored in the energy storage device;
   a boost regulator configured to vary feedback resistance based on one or more input signals to adjust an output voltage across the two electrical contacts; and
   a microcontroller configured to transmit the one or more input signals to the boost regulator to adjust the output voltage based on a power level of the energy storage device and a charging status of the energy storage device.

14. The retrofit assembly of claim 13, wherein to adjust the output voltage to indicate the power level of the energy storage device and the charging status of the energy storage device comprises to:
   adjust the output voltage to within a first voltage range if the charging status indicates that the energy storage device is charging; and
   adjust the output voltage to within a second voltage range if the charging status indicates that the energy storage device is not charging, wherein the second voltage range is non-overlapping with the first voltage range.

15. The retrofit assembly of claim 14, wherein to adjust the voltage output to indicative the power level of the energy storage device and the charging status of the energy storage device comprises to:
   adjust the output voltage to a voltage value within the first voltage range that is proportionate within the first voltage range to a percentage of power remaining in the energy storage device if the charging status indicates that the energy storage device is charging; and
   adjust the output voltage to a voltage value within the second voltage range that is proportionate within the second voltage range to a percentage of power remaining in the energy storage device if the charging status indicates that the energy storage device is not charging.

16. The retrofit assembly of claim 13, wherein the energy storage device, the wireless power receiver, the boost regulator, and the microcontroller form a portion of a modular component.

17. The retrofit assembly of claim 13, wherein the energy storage device comprises a rechargeable lithium battery.

18. The retrofit assembly of claim 13, wherein the retrofit assembly is electrically coupled to a lock device via only the two electrical contacts.

19. The retrofit assembly of claim 13, wherein the boost regulator comprises a boost converter and a feedback network.

20. The retrofit assembly of claim 19, wherein the feedback network comprises a digital potentiometer.

* * * * *